US011275768B2

(12) United States Patent
Salomon et al.

(10) Patent No.: US 11,275,768 B2
(45) Date of Patent: Mar. 15, 2022

(54) DIFFERENTIAL SUPPORT FOR FREQUENT PATTERN ANALYSIS

(71) Applicant: salesforce.com, inc., San Francisco, CA (US)

(72) Inventors: Yacov Salomon, Danville, CA (US); Kexin Xie, San Mateo, CA (US); Wanderley Liu, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 295 days.

(21) Appl. No.: 16/120,067

(22) Filed: Aug. 31, 2018

(65) Prior Publication Data

US 2019/0362017 A1 Nov. 28, 2019

Related U.S. Application Data

(60) Provisional application No. 62/676,794, filed on May 25, 2018.

(51) Int. Cl.
*G06F 16/28* (2019.01)
*G06F 16/2458* (2019.01)
*G06F 16/906* (2019.01)
*G06N 5/02* (2006.01)

(52) U.S. Cl.
CPC ........ *G06F 16/285* (2019.01); *G06F 16/2465* (2019.01); *G06F 16/906* (2019.01); *G06N 5/02* (2013.01)

(58) Field of Classification Search
None
See application file for complete search history.

(56) References Cited

U.S. PATENT DOCUMENTS

| 2009/0006460 | A1* | 1/2009 | Kleinberg | ............ G16B 40/00 |
| 2010/0179955 | A1* | 7/2010 | Wu | .................... G06F 16/2465 |
| | | | | 707/748 |
| 2017/0024395 | A1* | 1/2017 | Michelson | ............ G06F 16/287 |
| 2018/0285759 | A1* | 10/2018 | Wood | .................... G06N 3/006 |
| 2019/0272339 | A1* | 9/2019 | Wang | .................. G06K 9/6298 |

* cited by examiner

*Primary Examiner* — Neveen Abel Jalil
*Assistant Examiner* — John J Morris
(74) *Attorney, Agent, or Firm* — Holland & Hart LLP

(57) ABSTRACT

Methods, systems, and devices supporting differential support for frequent pattern (FP) analysis are described. Some database systems may analyze data sets to determine FPs of data attributes within the data sets. However, if data distributions for different types of data attributes vary greatly, more frequent data attribute types may skew the FPs away from the less frequent types. To reduce the noise of common attributes while maintaining sensitivity to the less common attributes, the database system may implement multiple minimum support (e.g., frequency) thresholds. For example, the database system may adaptively categorize the different data attribute types into data categories based on their distributions and may dynamically determine support thresholds for the categories. Using different minimum support thresholds for different data categories allows the system to filter out data attribute patterns based on the distributions of the data attribute types in the pattern.

20 Claims, 8 Drawing Sheets

US 11,275,768 B2

DIFFERENTIAL SUPPORT FOR FREQUENT PATTERN ANALYSIS

CROSS REFERENCES

The present Application for Patent claims priority to U.S. Provisional Patent Application No. 62/676,794 by Salomon et al., entitled "Differential Support for Frequent Pattern Analysis," filed May 25, 2018, which is assigned to the assignee hereof and expressly incorporated by reference herein.

FIELD OF TECHNOLOGY

The present disclosure relates generally to database systems and data processing, and more specifically to differential support for frequent pattern (FP) analysis.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may support frequent pattern (FP) analysis for data sets. For example, a data processing machine may determine FPs based on data in a database or data indicated by a user device. However, performing FP analysis on a data set containing data attributes with widely varying distributions may affect the quality of the resulting patterns. For example, if the data set includes data attributes that differ in frequency by multiple orders of magnitude, the FP analysis procedure may discount less common data attributes based on a much larger number of occurrences for more common data attributes (e.g., by removing the less common data attributes if they fall below a support threshold or based on the noise from the more common data attributes). This may result in the determined FPs missing important information related to rare data attribute types (e.g., the less common data attributes).

DETAILED DESCRIPTION

Figure 1:
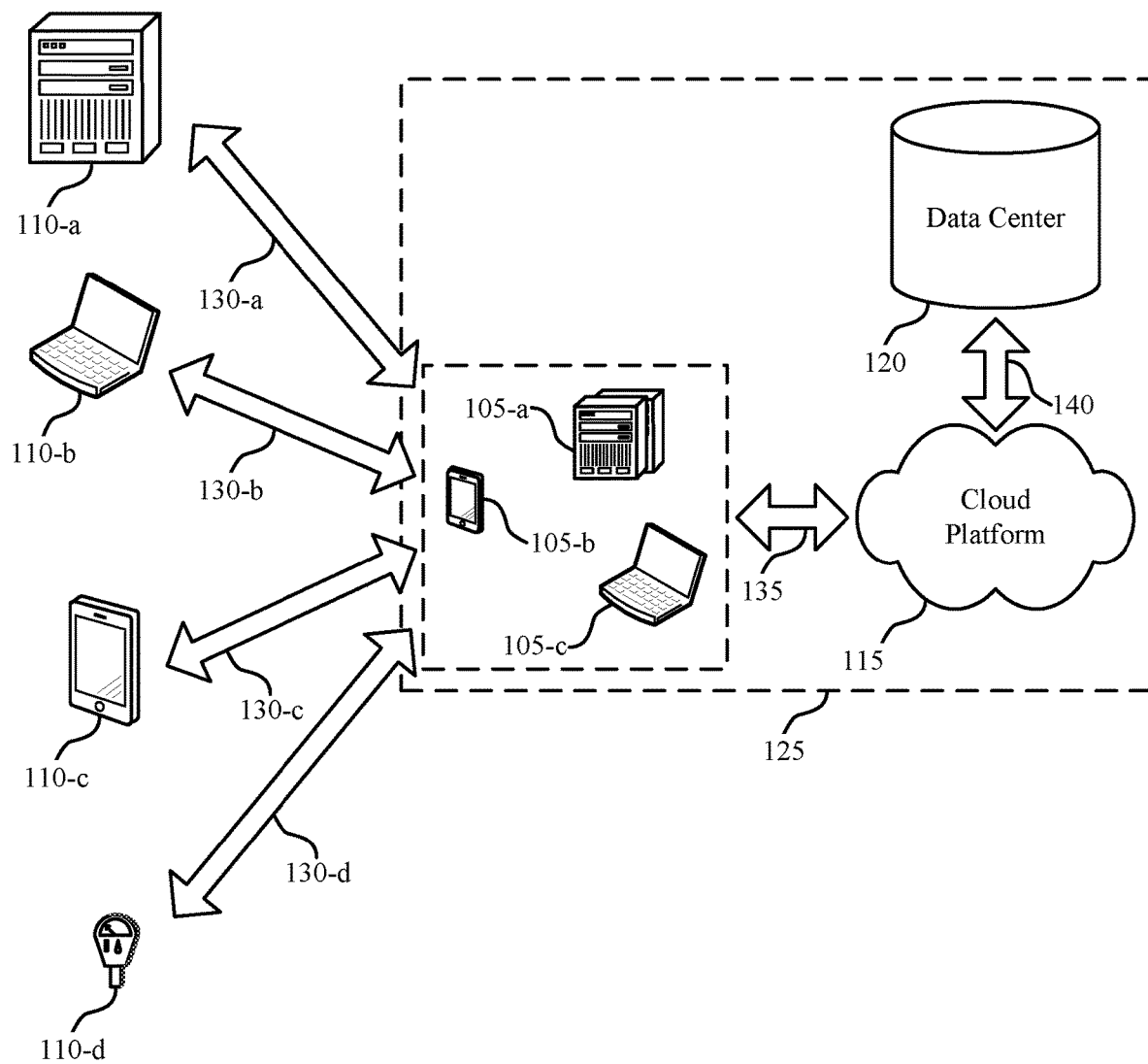
FIG. 1 illustrates an example of a system for frequent pattern (FP) analysis at a database system that supports differential support for FP analysis in accordance with aspects of the present disclosure.

Some database systems may perform frequent pattern (FP) analysis on data sets to determine common and interesting patterns within the data. These patterns may be useful to users for many customer relationship management (CRM) operations, such as marketing analysis or sales tracking. In some cases, a database system may automatically determine FPs for one or more data sets based on a configuration of the database system. In other cases, the database system may receive a command from a user device (e.g., based on a user input at the user device) to determine FPs for a data set. The database system may determine the FPs within a data set using one or more FP mining techniques. For example, for improved efficiency of the system and for a shorter latency in determining the patterns, the database system may transform the data set into a condensed data structure including an FP-tree and a linked list and may use an FP-growth model to derive the FPs. This condensed data structure may support faster FP mining than the original data set (e.g., a data set stored as a relational database table) can support, as well as faster querying of the determined patterns. For example, because the database system—or, more specifically, a data processing machine (e.g., a bare-metal machine, virtual machine, or container) at the database system—can generate the condensed data structure with just two passes through a data set and because determining the FPs from the condensed data structure may be on a scale of approximately one to two orders of magnitude faster than determining the FPs from the original data, the database system may significantly improve the latency involved in deriving the FPs and the corresponding patterns of interest. Further, if these FPs are stored and processed locally at a data processing machine, the latency involved in querying for the patterns (e.g., by a user device for processing or display) may be greatly reduced, as the data processing machine may handle the query locally without having to request information a database of the database system.

However, in some cases, the patterns derived by the FP-growth model may fail to represent important data characteristics due to a large variance in data distributions for different data attribute types. For example, a data set may contain data objects corresponding to multiple users or user devices in a system, and the data objects may include data attributes corresponding to activities performed by the users or characteristics of the users. Some data attribute types for the users may occur frequently (e.g., website visits, email communications, sensor readings, etc.), while other data attribute types for the users may occur rarely (e.g., certain transactional events, such as purchasing a product like a house or a car). However, these rarely occurring data attributes for the users may be more important or insightful in determining relevant patterns than hundreds or even thousands of occurrences of the common data attributes. In order to manage the different distributions associated with different data attribute types, the database system may implement multiple minimum support thresholds for filtering out different types of attributes.

For example, the database system may cluster the data attribute types into different data categories according to the different data distributions of the data attribute types. In some cases, distributions characterizing the frequency of data attributes per user and distributions characterizing the frequency of users per data attribute may be used to sort the data attribute types into the different data categories. The database system may then dynamically determine minimum support thresholds for each of the different data categories (e.g., each data category may correspond to a different minimum support threshold). The database system may utilize these minimum support thresholds for filtering out one or more patterns from the list of FPs produced by the FP mining process.

For each pattern, the database system may determine the data attribute type contained in the pattern that is part of a data category corresponding to a lowest minimum support threshold determined for the data category. In some cases, the database system may use this lowest minimum support threshold to determine whether the pattern qualifies as a "frequent" pattern. Additionally, the database system may recursively perform this support check on each sub-pattern of the pattern. If any sub-pattern does not meet the corresponding minimum support threshold for that sub-pattern, then the super-pattern (e.g., the pattern including all of the sub-patterns) fails to qualify as a "frequent" pattern. The database system may output the set of FPs resulting from this filtering of the patterns based on these multiple dynamic minimum support thresholds. By dynamically implementing the different thresholds, the database system may reduce the noise from common data attribute types that occur frequently, while maintaining sensitivity to the uncommon data attribute types that occur rarely.

Aspects of the disclosure are initially described in the context of an environment supporting an on-demand database service. Additional aspects of the disclosure are described with reference to a database system, a differential support process, and a process flow. Aspects of the disclosure are further illustrated by and described with reference to apparatus diagrams, system diagrams, and flowcharts that relate to differential support for FP analysis.

FIG. 1 illustrates an example of a system 100 for cloud computing that supports differential support for FP analysis in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Some systems 100 may include a data center 120 that performs FP analysis to determine common and interesting patterns within a data set. In some cases, the data center 120 may automatically determine FPs for one or more data sets based on a configuration of the data center 120. In other cases, the data center 120 may receive a command from a user device (e.g., a cloud client 105) to determine FPs for a data set. The data center 120 may determine the FPs within a data set using one or more FP mining techniques. For example, the data center 120 may transform the data set into a condensed data structure including an FP-tree and a linked list and may use an FP-growth model associated with the condensed data structure to derive the FPs to improve efficiency and reduce latency for determining the patterns within the system 100. This condensed data structure may support faster FP mining than the original data set (e.g., a data set stored as a relational database table) can support, as well as supporting faster querying of the determined patterns. For example, the data center 120 may significantly improve the latency involved in deriving the FPs and the corresponding patterns of interest for a data set based on generating the condensed data structure with fewer passes through the data set (e.g., via a data processing machine at the data center 120) and determining the FPs from the condensed data structure faster (e.g., one to two orders of magnitude faster) than determining the FPs from the original data set. Further, if these FPs are stored and processed locally at a data processing machine, the latency involved in querying for the patterns (e.g., by a cloud client 105 for processing or display) may be greatly reduced, as the data processing machine may handle the query locally without having to request information from a database of the data center 120.

However, in some cases, the patterns derived by the FP-growth model may fail to represent important data characteristics due to a large variance in data distributions for different data attribute types. For example, a data set may contain data objects corresponding to multiple users or user devices in the system 100 (e.g., cloud clients 105 and/or contacts 110), and the data objects may include data attributes corresponding to activities performed by the users or characteristics of the users. The data attributes may occur at intervals of different orders of magnitudes. For example, a first set of data attribute types may be classified as occurring frequently (e.g., website visits, email communications, sensor readings, etc.), while a second set of attribute types may be classified as occurring rarely (e.g., certain transactional events, such as purchasing product like a house or a car). However, the rarely occurring data attributes (e.g., the first set of data attributes) may be more important or insightful in determining relevant patterns for the users in the system 100 than hundreds or even thousands of the frequently occurring data attributes (e.g., the second set of data attributes). In order to manage the different orders of magnitudes for distributions associated with different data attribute types, the data center 120 may implement multiple minimum support thresholds for filtering out different types of data attributes to analyze the rarely occurring data attributes.

For example, the data center 120 may cluster the data attribute types into different data categories according to the different orders of magnitude for the data distributions of the data attribute types. In some cases, distributions characterizing the frequency of data attributes per user (e.g., how often each user performs all of the data attribute types) and distributions characterizing frequency of users per data attribute (e.g., how often all users perform each data attribute type) may be used to sort the data attribute types into the different data categories. The data center 120 may then dynamically determine minimum support thresholds for each of the different data categories to determine the rarely occurring data attributes (e.g., each data category may correspond to a different minimum support threshold). The data center 120 may utilize these minimum support thresholds for filtering out patterns from the list of FPs produced by the FP mining process.

For each pattern, the data center 120 may determine the data attribute contained in the pattern that is part of a data category corresponding to a lowest minimum support threshold. In some cases, the data center 120 may use this lowest minimum support threshold to determine whether the pattern qualifies as a "frequent" pattern. Additionally, the data center 120 may recursively perform this support check on each sub-pattern of the pattern. If any sub-pattern does not meet a corresponding minimum support threshold for that sub-pattern, then the super-pattern (e.g., the pattern including all of the sub-patterns) fails to qualify as a "frequent" pattern. The data center 120 may output the set of FPs resulting from this filtering of the patterns based on these multiple dynamic minimum support thresholds. By dynamically implementing the different thresholds, the data center 120 may reduce the noise from common data attribute types that occur frequently, while maintaining sensitivity to the uncommon data attribute types that occur rarely.

Conventional systems may implement a single minimum support threshold, across all data attributes. If this value is set low to avoid filtering out the rarely occurring uncommon data attribute types, the frequently occurring common data attribute types may introduce a large amount of noise to the pattern derivation process. If the minimum support threshold, is set to a high value to mitigate the noise of the frequently occurring common data attribute types, the threshold may filter out the rarely occurring uncommon data attribute types. These issues may be prevalent in conventional systems when handling data sets including attribute types with frequencies differing by one or more orders of magnitude.

In contrast, the system 100 may implement adaptive categorization of data attribute types to cluster the data attributes by similar data distributions into different groups. The system 100 may then dynamically determine minimum support thresholds specific to each group, such that the minimum support thresholds may be tuned (e.g., using hyper parameter tuning) to effectively handle the distributions of the grouped data attribute types. Based on the adaptive categorization and dynamic threshold tuning, a data center 120 in the system 100 may automatically update with each new or updated data set for FP analysis. These multiple dynamic minimum support thresholds may mitigate the noise from common data attribute types while maintaining the sensitivity of the FP mining process to the less common data attribute types (e.g., rarely occurring data attribute types). In this way, the resulting patterns may capture important information related to rare activities or events.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

As an example, the techniques described herein may be implemented when attempting to analyze data attribute types that occur less frequently for a dataset that include one or more users (e.g., cloud clients 105 and/or contacts 110) within a data center 120. The less frequently occurring data attributes (e.g., rare occurring data attributes) may include when a user purchases an object from a website they have visited. While many users in the data center 120 may visit the website and/or with greater regularity than a purchase is made, the actual purchases may provide more valuable information concerning the user or concerning which objects are being purchased. However, a conventional FP analysis on the dataset may be skewed toward the data attributes of website visits that occur with higher frequency than the data attributes of purchases made, or the purchases may not be included in the conventional FP analysis altogether based on a threshold that omits their lower frequency. Accordingly, by grouping the purchases together with similar low occurring data attributes and utilizing different minimum support thresholds specific for each grouping, the FP analysis may capture the purchases accurately for further data analysis. It is to be understood that website visits and purchases are merely an example, and the specific minimum support thresholds per group may be utilized for different data attributes.

Figure 2:
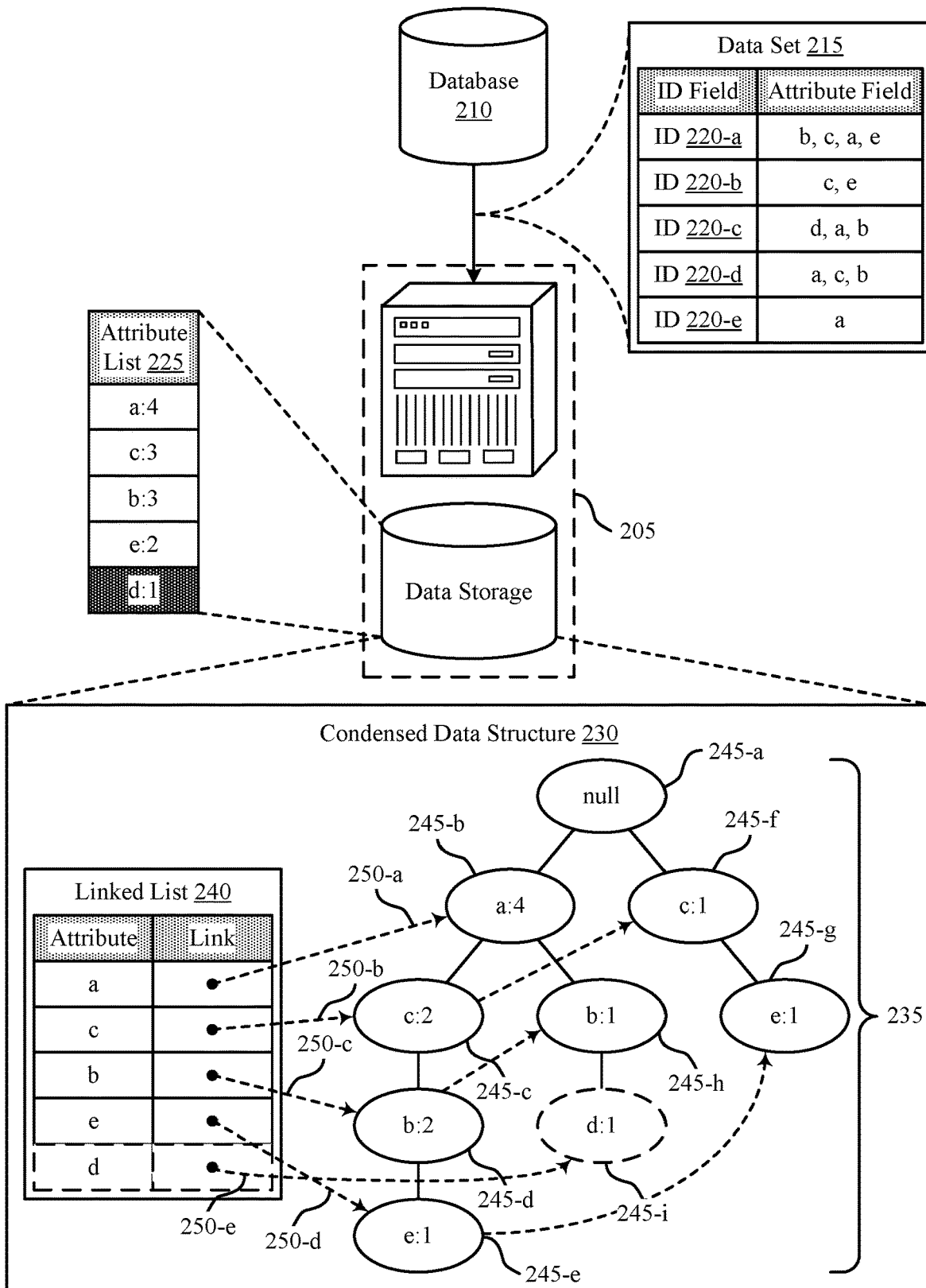
FIG. 2 illustrates an example of a database system implementing an FP analysis procedure that supports differential support for FP analysis in accordance with aspects of the present disclosure.

FIG. 2 illustrates an example of a database system 200 implementing an FP analysis procedure that supports differential support for FP analysis in accordance with aspects of the present disclosure. The database system 200 may be an example of a data center 120 as described with reference to FIG. 1, and may include a database 210 and a data processing machine 205. In some cases, the database 210 may be an example of a transactional database, a time-series database, a multi-tenant database, or some combination of these or other types of databases. The data processing machine 205 may be an example of a database server, an application server, a server cluster, a virtual machine, a container, or some combination of these or other hardware or software components supporting data processing for the database system 200. The data processing machine 205 may include a processing component and a local data storage component, where the local data storage component supports the memory resources of the data processing machine 205 and may be an example of a magnetic tape, magnetic disk, optical disc, flash memory, main memory (e.g., random access memory (RAM)), memory cache, cloud storage system, or combination thereof. The data processing machine 205 may perform an FP analysis on a data set 215 (e.g., based on a user input command or automatically based on a configuration of the database system 200 or a supported FP-based application).

As described herein, the database system 200 may implement an FP-growth model for pattern mining that utilizes a condensed data structure 230. The condensed data structure 230 may include an FP-tree 235 and a linked list 240 linked to the nodes 245 of the FP-tree 235 via links 250. However, it is to be understood that the database system 200 may alternatively use other FP analysis techniques and data structures than those described. For example, the database system 200 may use a candidate set generation-and-test technique, a tree projection technique, or any combination of these or other FP analysis techniques. In other cases, the database system 200 may perform an FP analysis procedure similar to the one described herein but containing fewer, additional, or alternative processes to those described. The differential support techniques described may be implemented with the FP-growth technique and the condensed data structure 230, or with any other FP analysis technique or data structure.

The data processing machine 205 may receive a data set 215 for processing. For example, the database 210 may transmit the data set 215 to the data processing machine 205 for FP analysis. The data set 215 may include multiple data objects, where each data object includes an identifier (ID) 220 and a set of data attributes. The data set 215 may include all data objects in the database 210, or may include data objects associated with a certain tenant (e.g., if the database 210 is a multi-tenant database), with a certain time period (e.g., if the attributes are associated with events or activities with corresponding timestamps), or with some other subset of data objects based on a user input value. For example, in some cases, a user operating a user device may select one or more parameters for the data set 215, and the user device may transmit the parameters to the database 210 (e.g., via a database or application server). The database 210 may transmit the data set 215 to the data processing machine 205 based on the received user input.

Each data object in the data set 215 may be identified based on an ID 220 and may be associated with one or more data attributes. These data attributes may be unique to that data object or may be common across multiple data objects. In some cases, an ID 220 may be an example of a text string unique to that data object. For example, if the data objects correspond to users in the database system 200, the IDs 220 may be user identification numbers, usernames, social security numbers, or some other similar form of ID where each value is unique to a user. The data attributes may be examples of activities performed by a data object (e.g., a user) or characteristics of the data object. For example, the data attributes may include information related to user devices operated by a user (e.g., internet protocol (IP) addresses, a total number of devices operated, etc.), information related to activities performed by the user while operating one of the user devices (e.g., web search histories, software application information, email communications, etc.), information related specifically to the user (e.g., information from a user profile, values or scores associated with the user, etc.), or a combination thereof. As illustrated in FIG. 2, these different data attributes may be represented by different letters (e.g., attributes {a}, {b}, {c}, {d}, and {e}).

In the exemplary case illustrated, the data set 215 may include five data objects. The first data object with ID 220-a may include data attributes {b, c, a, e}, the second data object with ID 220-b may include data attributes {c, e}, the third data object with ID 220-c may include data attributes {d, a, b}, the fourth data object with ID 220-d may include data attributes {a, c, b}, and the fifth data object with ID 220-e may include data attribute {a}. In one example, each data object may correspond to a different user or user device, and each data attribute may correspond to an activity or activity parameter performed by the user or user device. For example, attribute {a} may correspond to a user making a particular purchase online, while attribute {b} may correspond to a user visiting a particular website in a web browser of a user device. These data attributes may be binary values (e.g., Booleans) related to characteristics of a user.

The data processing machine 205 may receive the data set 215, and may construct a condensed data structure 230 based on the data set 215. The construction process may involve two passes through the data set 215, where the data processing machine 205 processes the data attributes for each data object in the data set 215 during each pass. In a first pass through the data set 215, the data processing machine 205 may generate an attribute list 225. The attribute list 225 may include the data attributes contained in the data set 215, along with their corresponding supports (i.e., occurrence frequencies within the data set 215). In some cases, during this first pass, the data processing machine 205 may filter out one or more attributes based on the supports for the attributes and a minimum support threshold, $\xi$. In these cases, the resulting data attributes included in the attribute list 225 may be referred to as frequent items or frequent attributes. The data processing machine 205 may order the data attributes in the attribute list 225 in descending order of support. For example, as illustrated, data processing machine 205 may identify that attribute {a} occurs four times in the data set 215, attributes {c} and {b} occur three times, attribute {e} occurs two times, and attribute {d} occurs one time. If the minimum support threshold, $\xi$, is equal to two, the data processing machine 205 may remove {d} from the attribute list 225 (or otherwise not include {d} in the attribute list 225) because the support for attribute {d} is less than the minimum support threshold. In some cases, a user may specify the minimum support threshold, $\xi$, using input features of a user interface. The data processing machine 205 may store the attribute list 225 in memory (e.g., temporary memory or persistent memory).

In a second pass through the data set 215, the data processing machine 205 may generate the condensed data structure 230 for efficient FP mining, where the condensed data structure 230 includes an FP-tree 235 and a linked list 240. The data processing machine 205 may generate a root node 245-$a$ for the FP-tree 235, and may label the root node 245-$a$ with a "null" value. Then, for each data object in the data set 215, the data processing machine 205 may order the attribute fields according to the order of the attribute list 225 (e.g., in descending order of support), and may add or update a branch of the FP-tree 235. For example, the data processing machine 205 may order the data attributes for the first data object with ID 220-$a$ in order of descending support {a, c, b, e}. As no child nodes 245 exist in the FP-tree 235, the data processing machine 205 may create new child nodes 245 representing this ordered set of data attributes. The node for the first attribute in the ordered set is created as a child node 245-$b$ of the root node 245-$a$, the node for the second attribute is created as a further child node 245-$c$ off of this child node 245-$b$, and so on. For example, the data processing machine may create node 245-$b$ for attribute {a}, node 245-$c$ for attribute {c}, node 245-$d$ for attribute {b}, and node 245-$e$ for attribute {e} based on the order of descending support. When creating a new node 245 in the FP-tree 235, the data processing machine 205 may additionally set the count for the node 245 to one (e.g., indicating the one instance of the data attribute represented by the node 245).

The data processing machine 205 may then process the second data object with ID 220-$b$. The data processing machine 205 may order the data attributes as {c, e} (e.g., based on the descending order of support as determined in the attribute list 225) and may check the FP-tree 235 for any nodes 245 stemming from the root node 245-$a$ that correspond to this pattern. As the first data attribute of this ordered set is {c}, and the root node 245-$a$ does not have a child node 245 for {c}, the data processing machine 205 may create a new child node 245-$f$ from the root node 245-$a$ for attribute {c} and with a count of one. Further, the data processing machine 205 may create a child node 245-$g$ off of this {c} node 245-$f$, where node 245-$g$ represents attribute {e} and is set with a count of one.

As a next step in the process, the data processing machine 205 may order the attributes for the data object with ID 220-$c$ as {a, b, d} and may add this ordered set to the FP-tree 235. In some cases, if data attribute {d} does not have a significantly large enough support value (e.g., as compared to the minimum support threshold, $\xi$), the data processing machine 205 may ignore the {d} data attribute (and any other data attributes that are not classified as "frequent" attributes) in the list of attributes for the data object. In either case, the data processing machine 205 may check the FP-tree 235 for any nodes 245 stemming from the root node 245-$a$ that correspond to this ordered set. Because child node 245-$b$ for attribute {a} stems from the root node 245-$a$, and the first attribute in the ordered set for the data object with ID 220-$c$ is {a}, the data processing machine 205 may determine to increment the count for node 245-$b$ rather than create a new node 245. For example, the data processing machine 205 may change node 245-$b$ to indicate attribute {a} with a count of two. As the only child node 245 off of node 245-$b$ is child node 245-$c$ for attribute {c}, and the next attribute in the ordered set for the data object with ID 220-$c$ is attribute {b}, the data processing machine 205 may generate a new child node 245-$h$ off of node 245-$b$ that corresponds to attribute {b} and may assign the node 245-$h$ a count of one. If attribute {d} is included in the attribute list 225, the data processing machine 205 may additionally create child node 245-$i$ for {d}.

This process may continue for each data object in the data set 215. For example, in the case illustrated, the data object with ID 220-$d$ may increment the counts for nodes 245-$b$, 245-$c$, and 245-$d$, and the data object with ID 220-$e$ may increment the count for node 245-$b$. Once the attributes—or the frequent attributes, when implementing a minimum support threshold—from each data object in the data set 215 are represented in the FP-tree 235, the FP-tree 235 may be complete in memory of the data processing machine 205 (e.g., stored in local memory for efficient processing and FP mining, or stored externally for improved memory capacity). By generating the ordered attribute list 225 in the first pass through the data set 215, the data processing machine 205 may minimize the number of branches needed to represent the data, as the most frequent data attributes are included closest to the root node 245-$a$. This may support efficient storage of the FP-tree 235 in memory. Additionally, generating the attribute list 225 allows the data processing machine 205 to identify infrequent attributes and remove these infrequent attributes when creating the FP-tree 235 based on the data set 215.

In addition to the FP-tree 235, the condensed data structure 230 may include a linked list 240. The linked list 240 may include all of the attributes from the attribute list 225 (e.g., all of the attributes in the data set 215, or all of the frequent attributes in the data set 215), and each attribute may correspond to a link 250. Within the table, these links 250 may be examples of head of node-links, where the node links point to one or more nodes 245 of the FP-tree 235 in sequence or in parallel. For example, the entry in the linked list 240 for attribute {a} may be linked to each node 245 in the FP-tree 235 for attribute {a} via link 250-$a$ (e.g., in this case, attribute {a} is linked to node 245-$b$). If there are multiple nodes 245 in the FP-tree 235 for a specific attribute, the nodes 245 may be linked in sequence. For example, attribute {c} of the linked list 240 may be linked to nodes 245-$c$ and 245-$f$ in sequence via link 250-$b$. Similarly, link 250-$c$ may link attribute {b} of the linked list 240 to nodes 245-$d$ and 245-$h$, link 250-$d$ may link attribute {e} to nodes 245-$e$ and 245-$g$, and—if frequent enough to be included in the attribute list 225-link 250-$e$ may link attribute {d} to node 245-$i$.

In some cases, the data processing machine 205 may construct the linked list 240 following completion of the FP-tree 235. In other cases, the data processing machine 205 may construct the linked list 240 and the FP-tree 235 simultaneously, or may update the linked list 240 after adding each data object representation from the data set 215 to the FP-tree 235. The data processing machine 205 may also store the linked list 240 in memory along with the FP-tree 235. In some cases, the linked list 240 may be referred to as a header table (e.g., as the "head" of the node-links are located in this table). Together, these two structures form the condensed data structure 230 for efficient FP mining at the data processing machine 205. The condensed data structure 230 may contain all information relevant to FP mining from the data set 215 (e.g., for a minimum support threshold, $\xi$). In this way, transforming the data set 215 into the FP-tree 235 and corresponding linked list 240 may support complete and compact FP mining.

The data processing machine 205 may perform a pattern growth method, FP-growth, to efficiently mine FPs from the information compressed in the condensed data structure 230. In some cases, the data processing machine 205 may determine the complete set of FPs for the data set 215. In other cases, the data processing machine 205 may receive a data attribute of interest (e.g., based on a user input in a user interface), and may determine all patterns for that data attribute. In yet other cases, the data processing machine 205 may determine a single "most interesting" pattern for a data attribute or a data set 215. The "most interesting" pattern may correspond to the FP with the highest occurrence rate, the longest list of data attributes, or some combination of a high occurrence rate and long list of data attributes. For example, the "most interesting" pattern may correspond to the FP with a number of data attributes greater than an attribute threshold with the highest occurrence rate, or the "most interesting" pattern may be determined based on a formula or table indicating a tradeoff between occurrence rate and length of the attribute list.

To determine all of the patterns for a data attribute, the data processing machine 205 may start from the head of a link 250 and follow the node link 250 to each of the nodes 245 for that attribute. The FPs may be defined based on a minimum support threshold, $\xi$, which may be the same minimum support threshold as used to construct the condensed data structure 230. For example, if $\xi=2$, a pattern is only considered "frequent" if it appears two or more times in the data set 215. To identify the complete set of FPs for the data set 215, the data processing machine 205 may perform the mining procedure on the attributes in the linked list 240 in ascending order. As attribute {d} does not pass the minimum support threshold of $\xi=2$, the data processing machine 205 may initiate the FP-growth method with data attribute {e}.

To determine the FPs for data attribute {e}, the data processing machine 205 may follow link 250-d for attribute {e}, and may identify node 245-e and node 245-g both corresponding to attribute {e}. The data processing machine 205 may identify that data attribute {e} occurs two times in the FP-tree 235 (e.g., based on summing the count values for the identified nodes 245-e and 245-g), and thus has at least the simplest FP of (e:2) (i.e., a pattern including attribute {e} occurs twice in the data set 215). The data processing machine 205 may determine the paths to the identified nodes 245, {a, c, b, e} and {c, e}. Each of these paths occurs once in the FP-tree 235. For example, even though node 245-b for attribute {a} has a count of four, this attribute {a} appears together with attribute {e} only once (e.g., as indicated by the count of one for node 245-e). These identified patterns may indicate the path prefixes for attribute {e}, namely {a:1, c:1, b:1} and {c:1}. Together, these path prefixes may be referred to as the sub-pattern base or the conditional pattern base for data attribute {e}. Using the determined conditional pattern base, the data processing machine 205 may construct a conditional FP-tree for attribute {e}. That is, the data processing machine 205 may construct an FP-tree using similar techniques as those described above, where the FP-tree includes only the attribute combinations that include attribute {e}. Based on the minimum support threshold, and the identified path prefixes {a:1, c:1, b:1} and {c:1}, only data attribute {c} may pass the support check. Accordingly, the conditional FP-tree for data attribute {e} may contain a single branch, where the root node 245 has a single child node 245 for attribute {c} with a count of two (e.g., as both of the path prefixes include attribute {c}). Based on this conditional tree, the data processing machine 205 may derive the FP (ce:2). That is, the attributes {c} and {e} occur together twice in the data set 215, while attribute {e} does not occur at least two times in data set 215 with any other data attribute. For conditional FP-trees with greater than one child node 245, the data processing machine 205 may implement a recursive mining process to determine all eligible FPs that contain the attribute being examined. The data processing machine 205 may return the FPs (e:2) and (ce:2) for the data attribute {e}. In some cases, the data processing machine 205 may not count patterns that simply contain the data attribute being examined as FPs, and, in these cases, may just return (ce:2).

This FP-growth procedure may continue with attribute {b}, then attribute {c}, and conclude with attribute {a}. For each data attribute, the data processing machine 205 may construct a conditional FP-tree. Additionally, because the FP-growth procedure is performed in an ascending order through the linked list 240, the data processing machine 205 may ignore child nodes 245 of the linked nodes 245 when determining the FPs. For example, for attribute {b}, the link 250-c may indicate nodes 245-d and 245-h. When identifying the paths for {b}, the data processing machine 205 may not traverse the FP-tree 235 past the linked nodes 245-d or 245-h, as any patterns for the nodes 245 below this on the tree were already determined in a previous step. For example, the data processing machine 205 may ignore node 245-e when determining the patterns for node 245-d, as the patterns including node 245-e were previously derived. Based on the FP-growth procedure and these conditional FP-trees, the data processing machine 205 may identify additional FPs for the rest of the data attributes in the linked list 240. For example, using a recursive mining process and based on the minimum support threshold of $\xi=2$, the data processing machine 205 may determine the complete set of FPs: (e:2), (ce:2), (b:3), (cb:2), (ab:3), (acb:2), (c:3), (ac:2), and (a:4).

In some cases, the data processing machine 205 may store the resulting patterns locally in a local data storage component. Additionally or alternatively, the data processing machine 205 may transmit the patterns resulting from the FP analysis to the database 210 for storage, or to a user device (e.g., for further processing or to display in a user interface). In some cases, the data processing machine 205 may determine a "most interesting" FP (e.g., (acb:2) based on the number of data attributes included in the pattern) and may transmit an indication of the "most interesting" FP to the user device. In other cases, the user device may transmit an indication of an attribute for examination (e.g., data attribute {c}), and the data processing machine 205 may return one or more of the FPs including data attribute {c} in response.

By transforming the data set 215 into the condensed data structure 230, the data processing machine 205 may avoid the need for generating and testing a large number of candidate patterns, which can be costly in terms of processing and memory resources, as well as in terms of time. For large database systems 200, databases 210, or data sets 215, the FP-tree 235 may be much smaller than the size of the data set 215, and the conditional FP-trees may be even smaller. For example, transforming a large data set 215 into an FP-tree 235 may shrink the data by a factor of approximately one hundred, and transforming the FP-tree 235 into a conditional FP-tree may again shrink the data by a factor of approximately one hundred, resulting in condensed data structures 230 for FP mining.

In some cases, the FP analysis procedure may support additional techniques for improved FP analysis or data handling. For example, the database system 200 may support techniques for distributed systems, differential support, epsilon ($\varepsilon$)-closure, or a combination thereof. In some cases, the data set 215 may include data attributes of extremely varying data distributions. For example, the data distributions for certain data attributes (e.g., purchase events for different items) may be relative similar, while the data distributions for other data attributes (e.g., visiting a particular website) may vary significantly. In some cases, the frequencies (i.e., support) for these different data attributes may differ by one or more orders of magnitude. Accordingly, handling each instance of these data attributes based on an identical support threshold may result in patterns skewed towards certain types of data attributes (e.g., the common attributes). To reduce the noise of common data attributes while still identifying rare attributes, the database system 200 may implement different support thresholds for the FP analysis procedure. That is, the database system 200 may cluster data attribute types into different data categories, where the attribute types within a category may share similar data distributions or distribution characteristics (e.g., average frequency, standard deviations, etc.). The database system 200 may determine different minimum support thresholds for the data categories (e.g., based on the different data distributions) and may utilize multiple different minimum support thresholds in the FP-growth model to improve the FPs derived by the FP mining process. In this way, the database system 200 may utilize higher support thresholds for generally more common data attributes and lower support thresholds for generally more uncommon data attributes based on the data attribute categories.

Figure 3:
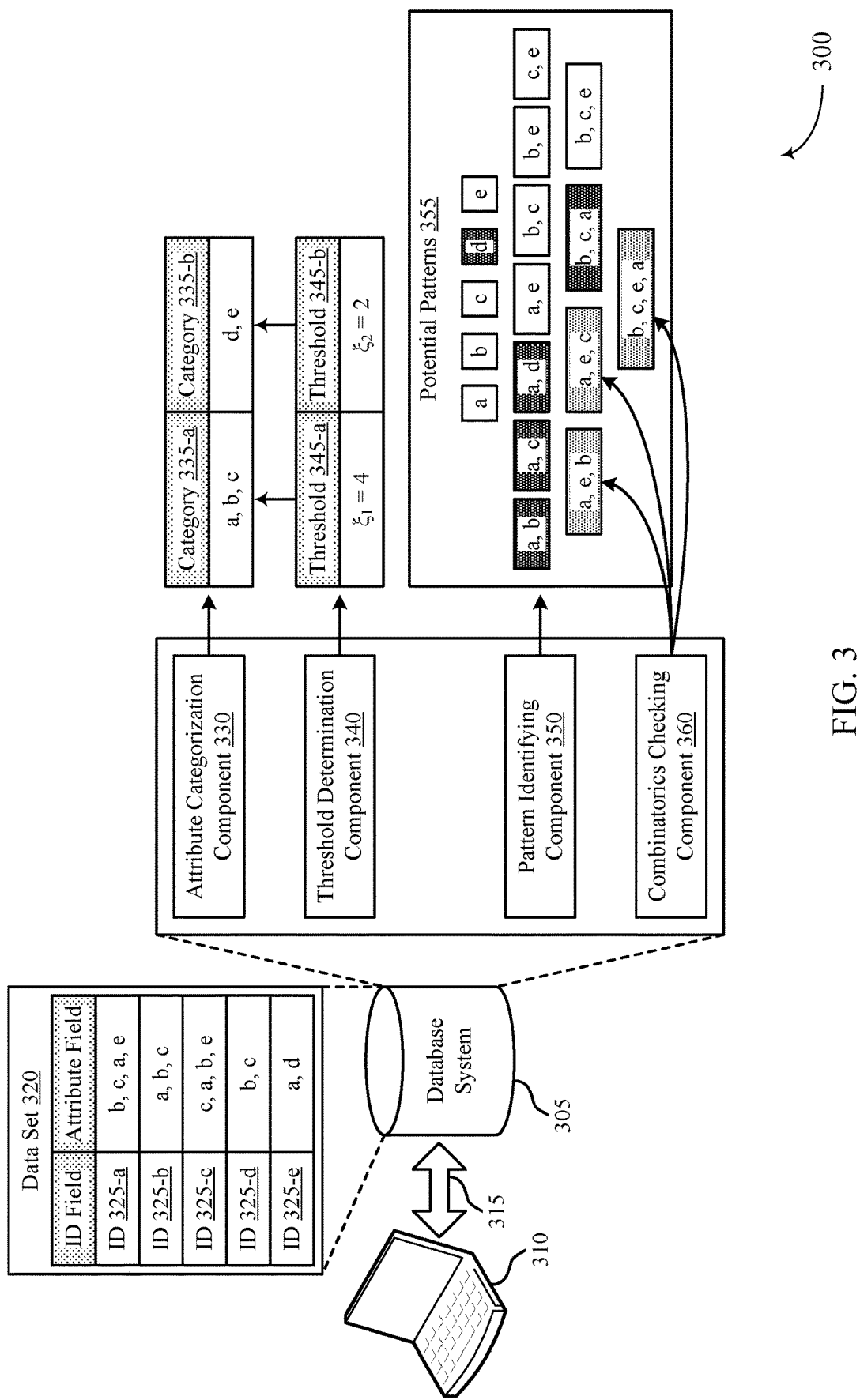
FIG. 3 illustrates an example of a process for implementing differential support for FP analysis in accordance with aspects of the present disclosure.

FIG. 3 illustrates an example of a process 300 for implementing differential support for FP analysis in accordance with aspects of the present disclosure. The process 300 may include a database system 305, which may be an example of a data center 120 or a database system 200 as described with reference to FIGS. 1 and 2. In some cases, the database system 305 may interact with a user device 310 (e.g., via a communication link 315). The user device 310 may transmit user input signals to the database system 305 for processing, and the database system 305 may transmit patterns to the user device 310 for processing or display in a user interface. In some cases, the database system 305 may receive a data set 320 for FP analysis (e.g., indicated by the user device 310 or retrieved from a database of the database system 305). The database system 305 may implement differential support thresholds for the FP analysis to improve the relevance and accuracy of the resulting patterns.

For example, the database system 305 may identify a data set 320 for FP analysis. The data set 320 may include a number of data objects, where each data object includes an ID 325 and a set of data attributes. In the exemplary case illustrated, the data set 320 may contain a first data object with an ID 325-$a$ and data attributes {b, c, a, e}, a second data object with an ID 325-$b$ and data attributes {a, b, c}, a third data object with an ID 325-$c$ and data attributes {c, a, b, e}, a fourth data object with an ID 325-$d$ and data attributes {b, c}, and a fifth data object with an ID 325-$e$ and data attributes {a, d}. These data objects may be examples of users or user devices, and the data attributes may correspond to activities performed by the users or user devices or characteristics associated with the users or user devices. In some cases, the data set 320 may correspond to users associated with a specific tenant of the database system 305, data attributes occurring within a specific window in time, or some other specific subset of users or user devices (e.g., users associated with a certain geographic region, characteristic, etc.).

The database system 305 may include one or more data processing machines for FP analysis. These data processing machines may be examples of database servers, application servers, server clusters, virtual machines, containers, or some combination of these or additional data processing machines. A data processing machine may include an attribute categorization component 330, a threshold determination component 340, a pattern identifying component 350, and a combinatorics checking component 360 implemented in hardware and/or software modules. These components may interact to handle dynamic differential support while maintaining consistent and complete FP mining techniques.

For example, the attribute categorization component 330 may support adaptive categorization of the data attributes into data attribute categories. The data attributes may be clustered or grouped into the categories based on classifications of the data attributes or based on data distributions of the data attributes. In some cases, the attribute categorization component 330 may support two data distributions that drive the adaptive categorization process: the number of data objects for each number of data attributes and the number of data attributes for each number of data objects. These distributions may be associated with commonality and combinatorics for the data set 320. For example, the number of data objects for each number of data attributes may describe the spread of the attribute set amongst the data objects (e.g., how many data objects contain one data attribute, how many contain two attributes, etc.). The number of data attributes for each number of data objects may describe the richness of the attribute set (e.g., how many attributes apply to only one data object, how many apply to two data objects, etc.). In some cases, based on where a data attribute is located within these data distributions, the attribute categorization component 330 may assign the data attribute to a specific data category or bucket.

As illustrated, based on these data distributions or other categorization parameters, the attribute categorization component 330 may create two data attribute categories 335, and may assign the attributes present in the data set 320 to the different categories 335-$a$ and 335-$b$. In some cases, the attribute categorization component 330 may not assign data attributes to any category 335 if the frequencies of the data attributes are below a global minimum support threshold, $\xi_{global}$. That is, the global minimum support threshold may correspond to an absolute minimum frequency for a data attribute to be identified as "frequent," regardless of the data attribute category 335. As illustrated, the attribute categorization component 330 may cluster data attributes {a, b, c} into category 335-a and data attributes {d, e} into category 335-b. Category 335-a may correspond to more common data attributes than category 335-b. For example, data attributes {a, b, c} may represent different web sites visited by a user or user device, while data attributes {d, e} may represent different transaction activities (e.g., purchases) performed by the user or user device. These clusters (e.g., the attributes contained in each category 335) may correspond to groupings with meaningful distributions (e.g., the distributions of each attribute in a category 335 may have similar characteristics).

Once the data attribute categories 335 are defined, the threshold determination component 340 may dynamically determine minimum support thresholds on a category-by-category basis. That is, different categories 335 may utilize different minimum support thresholds 345 relevant to each category 335, but data attributes within a same category 335 may utilize a same threshold 345. In some cases, the database system 305 may receive a user input signal (e.g., from an administrative user) that may be used to determine the thresholds 345. In other cases, the threshold selection procedure may be fully automated at the database system 305. For example, the threshold determination component 345 may dynamically or semi-statically determine a threshold 345 for a data attribute category 335 based on an average frequency of the attributes for that data attribute category 335, a standard deviation or other measurement of variation within the data attribute category 335, a minimum or maximum frequency value for an attribute in the data attribute category 335, a number of data objects in the data set 320, one or more user input values (e.g., transmitted to the database system 305 by a user device 310), an "importance" metric (e.g., an integer value representing a level of importance of the corresponding activity or characteristic) of one or more data attributes grouped within the data attribute category 335, or any combination of these or other relevant parameters.

The threshold determination component 340 may tune the minimum support thresholds 345 to manage the variance in data distribution between different data categories. In some cases, the threshold determination component 340 may implement hyper parameter tuning. Certain activities corresponding to data attributes may occur multiple orders of magnitude more often than other activities. However, rare activities may correspond to important or insightful activities and patterns, while common activities may be inconsequential. For example, an attribute representing the transaction event "bought a car" may only occur a few times, but may result in interesting patterns within a data set 320 for analysis purposes (e.g., FP analysis). Alternatively, an attribute representing the activity "opened an email application" may occur thousands or millions of times, but may not result in interesting patterns for analysis purposes. To handle such a wide variance in support for data attributes, the database system 305 may implement threshold determination algorithms or functions to remove or soften noisy data attributes (e.g., from the common activities), while maintaining sensitivity to rare but important data attributes. In this way, the "bought a car" attribute may be grouped into a category 335 with a low minimum support threshold 345 (e.g., $\xi=2$), while the "opened an email application" may be grouped into a category 335 with a high minimum support threshold (e.g., $\xi=1000$). As illustrated for the small exemplary data set 320, the threshold determination component 330 may dynamically determine a threshold 345-a of $\xi_1=4$ corresponding to data attribute category 335-a and a threshold 345-b of $\xi_2=2$ corresponding to data attribute category 335-b.

A pattern identifying component 350 may identify a set of potential patterns 355 for the data set 320. For example, the database system 305 may perform an FP mining procedure as described above with reference to FIG. 2, but adjusted to handle multiple thresholds. Accordingly, the adjusted FP mining procedure may implement differential support thresholds 345 for the different data attribute categories 335, as opposed to implementing a single minimum support threshold, $\xi$, for filtering out infrequent patterns. In some cases, the pattern identifying component 350 may work in conjunction with a combinatorics checking component 360 to implement the differential support thresholds 345.

For example, as illustrated, the database system 305 may determine FPs of the data set 320 according to the different minimum support thresholds 345. For each potential pattern, the pattern identifying component 355 may determine whether the pattern passes the lowest minimum support threshold 345 corresponding to a data category 335 of a data attribute in the pattern. For example, if a pattern contains either data attribute {d} or {e}, the database system 305 may utilize threshold 345-b ($\xi_2=2$) corresponding to data category 335-b, while if the pattern contains some combination of only data attributes {a}, {b}, and {c}, the database system 305 may utilize threshold 345-a ($\xi_1=4$) corresponding to data category 335-a. Based on this initial support check, potential patterns (d:1) and (ad:1) may fail the support check with lower frequencies than threshold 345-b, and potential patterns (ab:3), (ac:3), and (abc:3) may fail the support check with lower frequencies than threshold 345-a.

However, the combinatorics checking component 360 may additionally test each combination within a pattern to ensure that each sub-pattern of the pattern also passes the support check. For example, pattern (abe:2) passes the initial support check, as the pattern includes a data attribute, {e}, from data attribute category 335-b, and correspondingly is tested against the threshold 345-b ($\xi_2=2$). However, the combinatorics checking component 360 may additionally test each sub-pattern of (abe:2), namely (ab:3), (ae:2), (be:2), (a:4), (b:4), and (e:2). Because (ab:3) only contains data attributes from data attribute category 335-a, the database system 305 may test the pattern (ab:3) against the dynamic minimum support threshold 345-a ($\xi_1=4$) for category 335-a. Accordingly, (ab:3) does not pass the support check, resulting in the pattern (abe:2) (e.g., a super-pattern consisting of above identified sub-patterns) failing the support check as well. Similarly, pattern (ace:2) may fail the support check based on sub-pattern (ac:3) and pattern (abce:2) (e.g., super-pattern (abce:2)) may fail the support check based on multiple sub-patterns, including at least (abc:3). Based on the differential support tests performed by pattern identifying component 350 and combinatorics checking component 360, the database system 305 may identify the valid FPs (a:4), (b:4), (c:4), (e:2), (ae:2), (bc:4), (be:2), (ce:2), and (bce:2). For example, (bce:2) is a valid pattern as every sub-pattern of (bce:2)—that is, (b:4), (c:4), (e:2), (bc:4), (be:2), and (ce:2)—is also a valid pattern.

By implementing differential support thresholds as described above, the database system 305 may retrieve patterns from an adjusted FP mining process that limits the noise of extremely common data attributes while still identifying and capturing extremely rare data attributes. By including the support checks in an FP-growth procedure, the database system 305 may maintain the completeness of the FP mining process, with more accurate resulting FPs for data sets 320 with data attribute types of widely varying distributions.

Figure 4:
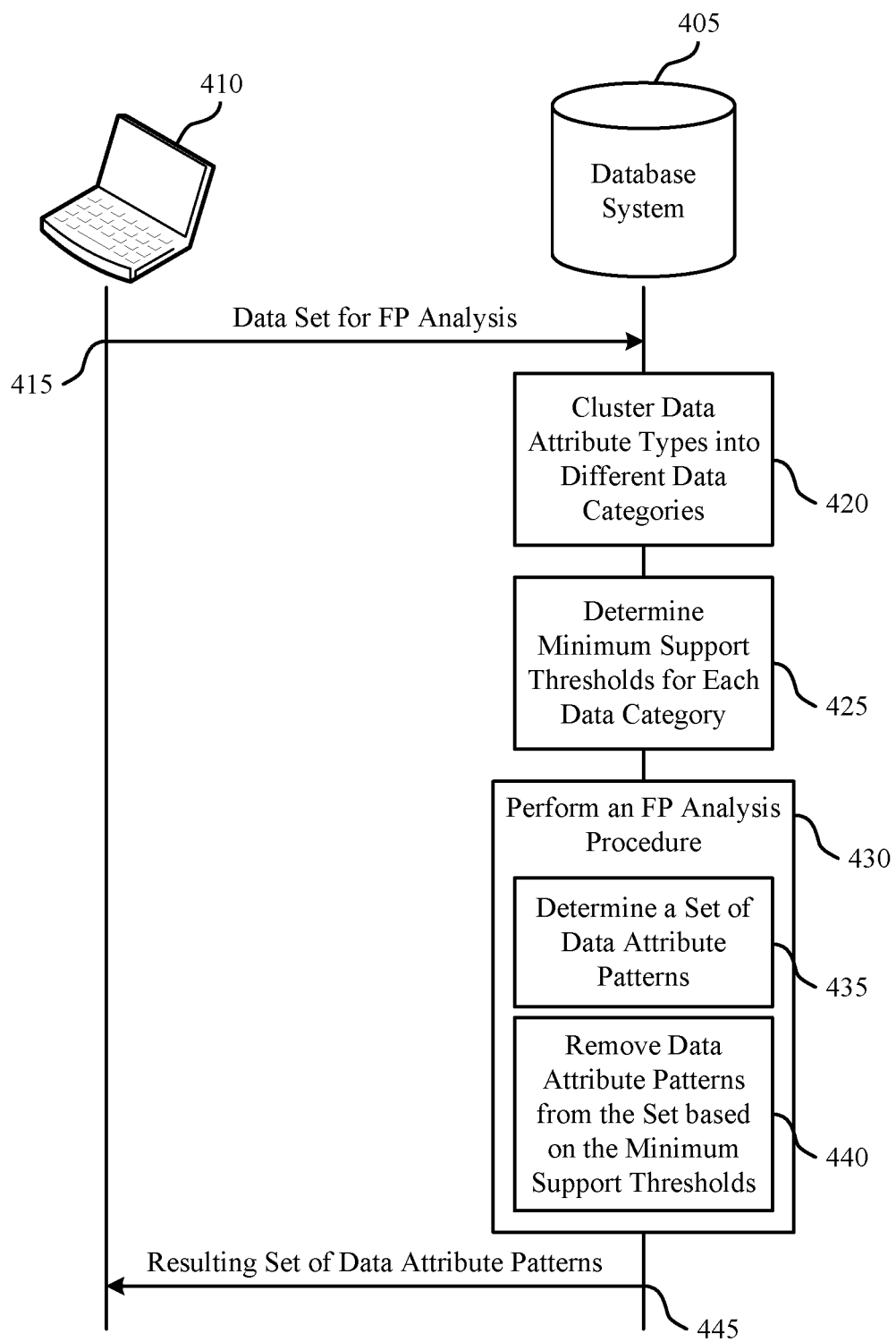
FIG. 4 illustrates an example of a process flow that supports differential support for FP analysis in accordance with aspects of the present disclosure.

FIG. 4 illustrates an example of a process flow 400 that supports differential support for FP analysis in accordance with aspects of the present disclosure. The process flow 400 may include a database system 405 and a user device 410, which may be examples of the corresponding devices described with reference to FIGS. 1 through 3. During an FP analysis procedure, the database system 405 may utilize different support thresholds for different categories of data attributes to handle discrepancies in relevant frequencies for different types of attributes. For example, a relevant number of times a user purchases a dress may be different than the relevant number of times the user visits a particular website. As such, the database system 405 may implement different minimum support thresholds for these and other data attributes. In some implementations, the processes described below may be performed in a different order or may include one or more additional or alternative processes performed by the devices.

At 415, the database system 405 may receive a data set for FP analysis. For example, the database system 405 may determine the data set for analysis based on receiving an FP analysis request from the user device 410. In other cases, the database system 405 may retrieve the data set from a database (e.g., based on an event trigger or a configuration of the database system 405), where the data set contains data associated with a certain time period, a certain tenant, or some other set or subset of data. This data set may contain multiple data objects, where each data object includes a number of data attributes. Each data object may additionally include an ID. In some cases, the data objects may correspond to users or user devices, and the data attributes may correspond to activities performed by the users or user devices, parameters of activities performed by the users or user devices, or characteristics of the users or user devices.

At 420, the database system 405 may cluster data attribute types into a set of data categories. This clustering may be performed according to one or more data distributions (e.g., the frequency of data attributes per data object, the frequency of data objects per attribute, etc.) of each of the data attribute types. For example, certain types of activities, events, or characteristics may be more frequent in the data set due to aspects of the data attributes. If the data objects correspond to users or user devices, the data categories may include categories related to any user activities associated with operating a user device, including but not limited to transactional events, website visits, Internet of Things (IoT) processes, online or offline activities or characteristics, or service center operations.

At 425, the database system 405 may dynamically determine minimum support thresholds for each of the data categories. For example, these thresholds may be determined based on an average frequency of the attributes within the data set for that data attribute category, a standard deviation or other measurement of variation within the data attribute category, a minimum or maximum frequency value for an attribute in the data attribute category, a number of data objects in the data set, one or more user input values (e.g., transmitted to the database system 405 by a user device, such as user device 410, operated by an administrative user of the database system 405 or by a client of the database system 405), an "importance" metric (e.g., an integer value representing a level of importance of the corresponding activity or characteristic) of one or more data attributes grouped within the data attribute category, or any combination of these or other relevant parameters.

At 430, the database system 405 (e.g., one or more data processing machines supporting the database system 405) may perform an FP analysis procedure on the data set received at 415. In some cases, the FP analysis procedure may implement a condensed data structure for efficient FP mining, where the condensed data structure includes an FP-tree and a linked list. At 435, the database system 405 may derive a set of data attribute patterns (e.g., FPs based on an FP-growth model and the condensed data structure) for the data set. Each data attribute pattern may include one or more data attributes and a number of occurrences (e.g., the support for the pattern) of the data attribute pattern within the data set.

At 440, the database system 405 may remove data attribute patterns from the set of data attribute patterns based on the determined minimum support thresholds. For example, the database system 405 may remove any data attribute pattern from the set of data attribute patterns if the number of occurrences (i.e., support) for that pattern is less than the smallest dynamically determined minimum support threshold for a data category of the data attributes in the pattern. Additionally, the database system 405 may remove any data attribute pattern that contains a sub-pattern with a number of occurrences less than the smallest dynamically determined minimum support threshold for a data category of the data attributes in the sub-pattern.

At 445, the database system 405 may transmit an indication of the resulting set of data attribute patterns to the user device 410 for processing or display in a user interface. In some cases, the database system 405 may additionally or alternatively store the resulting FPs in a database or in the local memory of a data processing machine.

Figure 5:
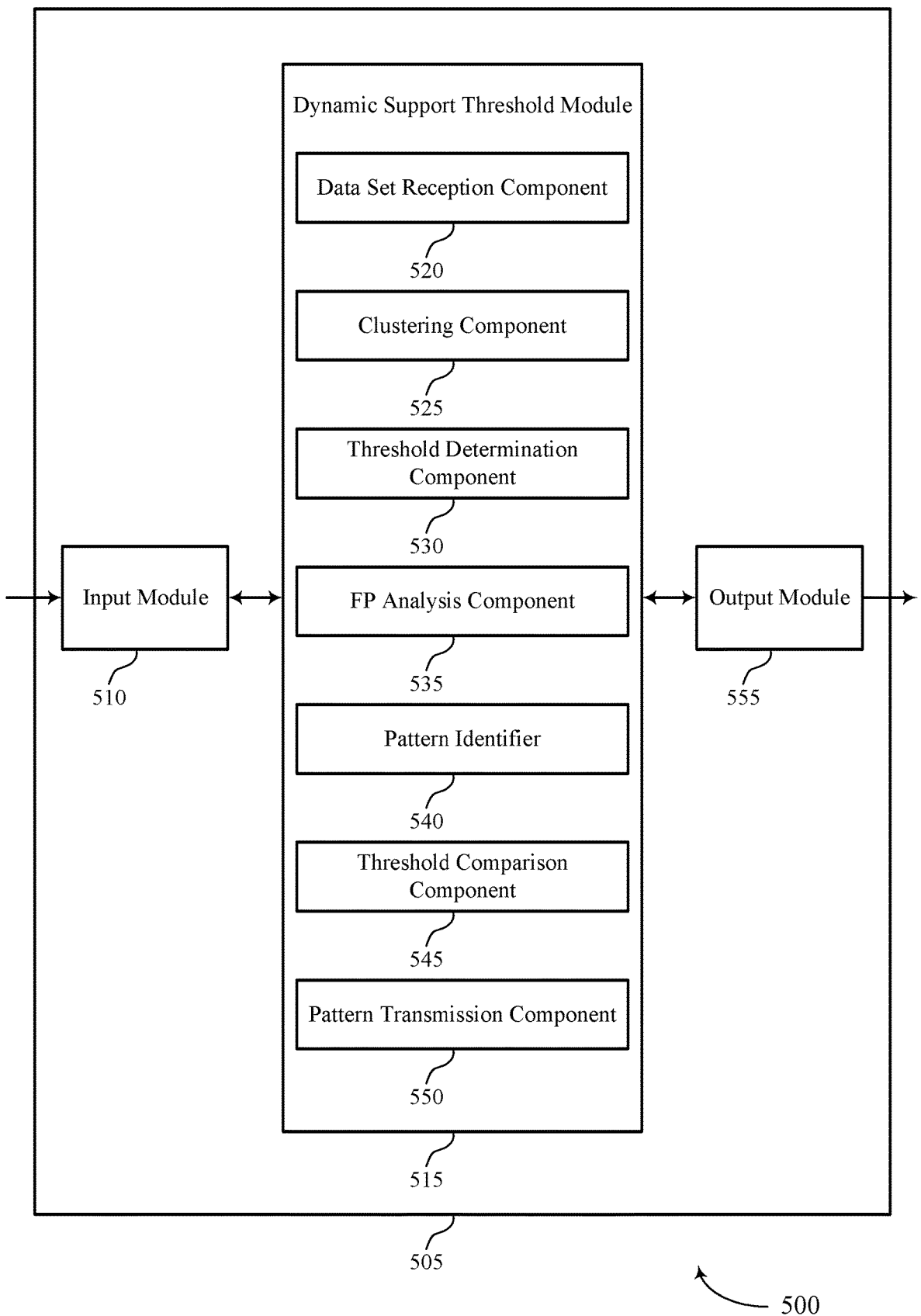
FIG. 5 shows a block diagram of an apparatus that supports differential support for FP analysis in accordance with aspects of the present disclosure.

FIG. 5 shows a block diagram 500 of an apparatus 505 that supports differential support for FP analysis in accordance with aspects of the present disclosure. The apparatus 505 may include an input module 510, a dynamic support threshold module 515, and an output module 555. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the dynamic support threshold module 515 to support differential support for FP analysis. In some cases, the input module 510 may be a component of an input/output (I/O) controller 715 as described with reference to FIG. 7.

The dynamic support threshold module 515 may include a data set reception component 520, a clustering component 525, a threshold determination component 530, an FP analysis component 535, a pattern identifier 540, a threshold comparison component 545, and a pattern transmission component 550. The dynamic support threshold module 515 may be an example of aspects of the dynamic support threshold module 605 or 710 described with reference to FIGS. 6 and 7.

The dynamic support threshold module 515 and/or at least some of its various sub-components may be implemented in hardware, software executed by a processor, firmware, or any combination thereof. If implemented in software executed by a processor, the functions of the dynamic support threshold module 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The dynamic support threshold module 515 and/or at least some of its various sub-components may be physically located at various positions, including being distributed such that portions of functions are implemented at different physical locations by one or more physical devices. In some examples, the dynamic support threshold module 515 and/or at least some of its various sub-components may be a separate and distinct component in accordance with various aspects of the present disclosure. In other examples, the dynamic support threshold module 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The data set reception component 520 may receive, at a database system, a data set for FP analysis, the data set including a set of data objects, where each of the set of data objects includes a set of data attributes. The clustering component 525 may cluster data attribute types into a set of data categories according to one or more data distributions of each of the data attribute types. The threshold determination component 530 may dynamically determine a minimum support threshold for each of the set of data categories.

The FP analysis component 535 may perform an FP analysis procedure on the received data set. The FP analysis procedure may include a pattern identifier 540 determining a set of data attribute patterns for the set of data objects of the data set, where each data attribute pattern of the set of data attribute patterns includes one or more data attributes and a number of occurrences of the data attribute pattern in the data set. The FP analysis procedure may further include a threshold comparison component 545 removing a data attribute pattern from the set of data attribute patterns if the number of occurrences of the data attribute pattern or a number of occurrences of a data attribute sub-pattern of the data attribute pattern is less than a dynamically determined minimum support threshold for a data category associated with the data attribute pattern or the data attribute sub-pattern. The pattern transmission component 550 may transmit an indication of the set of data attribute patterns resulting from the FP analysis procedure.

The output module 555 may manage output signals for the apparatus 505. For example, the output module 555 may receive signals from other components of the apparatus 505, such as the dynamic support threshold module 515, and may transmit these signals to other components or devices. In some specific examples, the output module 555 may transmit output signals for display in a user interface, for storage in a database or data store, for further processing at a server or server cluster, or for any other processes at any number of devices or systems. In some cases, the output module 555 may be a component of an I/O controller 715 as described with reference to FIG. 7.

Figure 6:
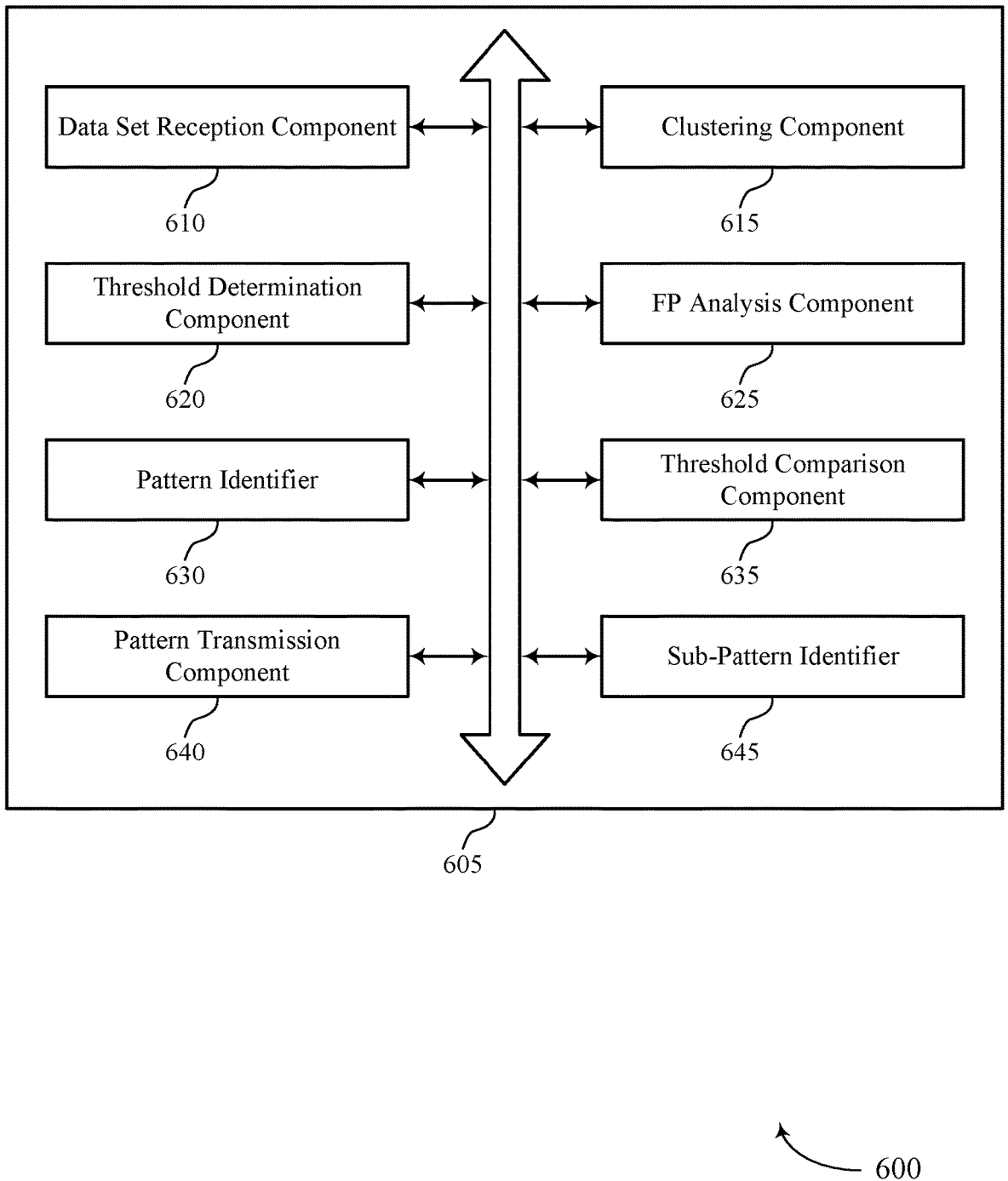
FIG. 6 shows a block diagram of a dynamic support threshold module that supports differential support for FP analysis in accordance with aspects of the present disclosure.

FIG. 6 shows a block diagram 600 of a dynamic support threshold module 605 that supports differential support for FP analysis in accordance with aspects of the present disclosure. The dynamic support threshold module 605 may be an example of aspects of a dynamic support threshold module 515 or a dynamic support threshold module 710 described herein. The dynamic support threshold module 605 may include a data set reception component 610, a clustering component 615, a threshold determination component 620, an FP analysis component 625, a pattern identifier 630, a threshold comparison component 635, a pattern transmission component 640, and a sub-pattern identifier 645. Each of these modules may communicate, directly or indirectly, with one another (e.g., via one or more buses).

The data set reception component 610 may receive, at the database system, a data set for FP analysis, the data set including a set of data objects, where each of the set of data objects includes a set of data attributes. In some cases, the set of data objects may include a set of users within the database system, and the set of data attributes may include activities performed by the set of users or characteristics associated with the set of users.

The clustering component 615 may cluster data attribute types into a set of data categories according to one or more data distributions of each of the data attribute types. In some cases, the one or more data distributions of each of the data attribute types may include a set of distributions characterizing frequency of data attributes per data object and frequency of data objects per data attribute.

The threshold determination component 620 may dynamically determine a minimum support threshold for each of the set of data categories. In some cases, one or more dynamically determined minimum support thresholds for the set of data categories may be based on a user input, a data distribution of a data attribute type, or a combination thereof. Additionally or alternatively, the one or more dynamically determined minimum support thresholds for the set of data categories may be based on an average frequency of data attributes for a data category, a standard deviation within the data category, a minimum frequency value for an attribute in the data category, a maximum frequency value for an attribute in the data category, a number of data objects in the data set, one or more user input values, an importance metric of one or more data attributes grouped within the data category, or a combination thereof.

In some cases, when dynamically determining the minimum support threshold for each of the plurality of data categories, the threshold determination component 620 may tune the minimum support thresholds to manage a variance in the data distributions for each of the set of data categories and perform one or more threshold determination algorithms to reduce noise from data with a high data distribution. Additionally, tuning the minimum support thresholds to manage the variance in the data distributions for each of the set of data categories may include the threshold determination component 620 executing a hyper parameter tuning process.

The FP analysis component 625 may perform an FP analysis procedure on the received data set. In some cases, the FP analysis may be performed by one or more data processing machines within the database system, the one or more data processing machines comprising database servers, application servers, server clusters, virtual machines, containers, or a combination thereof. Additionally or alternatively, when performing the FP analysis procedure on the received data set, the FP analysis component 625 may execute a condensed data structure for an FP mining process, where the condensed data structure includes an FP-tree and a linked list.

The pattern identifier 630 may determine a set of data attribute patterns for the set of data objects of the data set, where each data attribute pattern of the set of data attribute patterns includes one or more data attributes and a number of occurrences of the data attribute pattern in the data set. The threshold comparison component 635 may remove a data attribute pattern from the set of data attribute patterns if the number of occurrences of the data attribute pattern or a number of occurrences of a data attribute sub-pattern of the data attribute pattern is less than a dynamically determined minimum support threshold for a data category associated with the data attribute pattern or the data attribute sub-pattern.

The pattern transmission component 640 may transmit an indication of the set of data attribute patterns resulting from the FP analysis procedure.

The sub-pattern identifier 645 may identify all possible sub-patterns associated with a data attribute pattern of the set of data attribute patterns. In some examples, the threshold comparison component 635 may evaluate a support threshold for each of the possible sub-patterns, where the support threshold is a smallest dynamically determined minimum support threshold corresponding to any data category to which a data attribute of the each of the possible sub-patterns belongs.

Figure 7:
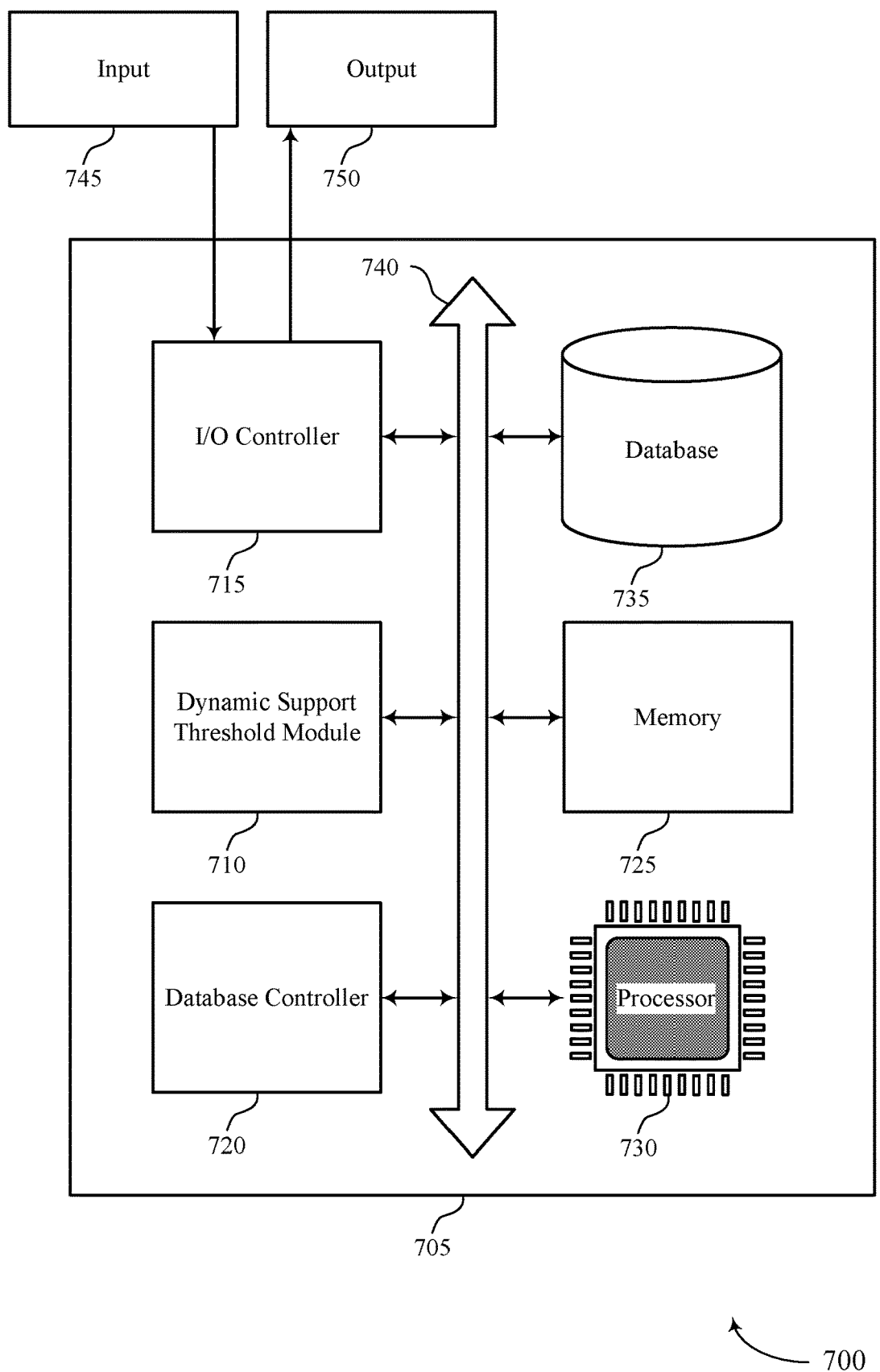
FIG. 7 shows a diagram of a system including a device that supports differential support for FP analysis in accordance with aspects of the present disclosure.

FIG. 7 shows a diagram of a system 700 including a device 705 that supports differential support for FP analysis in accordance with aspects of the present disclosure. The device 705 may be an example of or include the components of a database system or an apparatus 505 as described herein. The device 705 may include components for bi-directional data communications including components for transmitting and receiving communications, including a dynamic support threshold module 710, an I/O controller 715, a database controller 720, memory 725, a processor 730, and a database 735. These components may be in electronic communication via one or more buses (e.g., bus 740).

The dynamic support threshold module 710 may be an example of a dynamic support threshold module 515 or 605 as described herein. For example, the dynamic support threshold module 710 may perform any of the methods or processes described above with reference to FIGS. 5 and 6. In some cases, the dynamic support threshold module 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting differential support for FP analysis).

Figure 8:
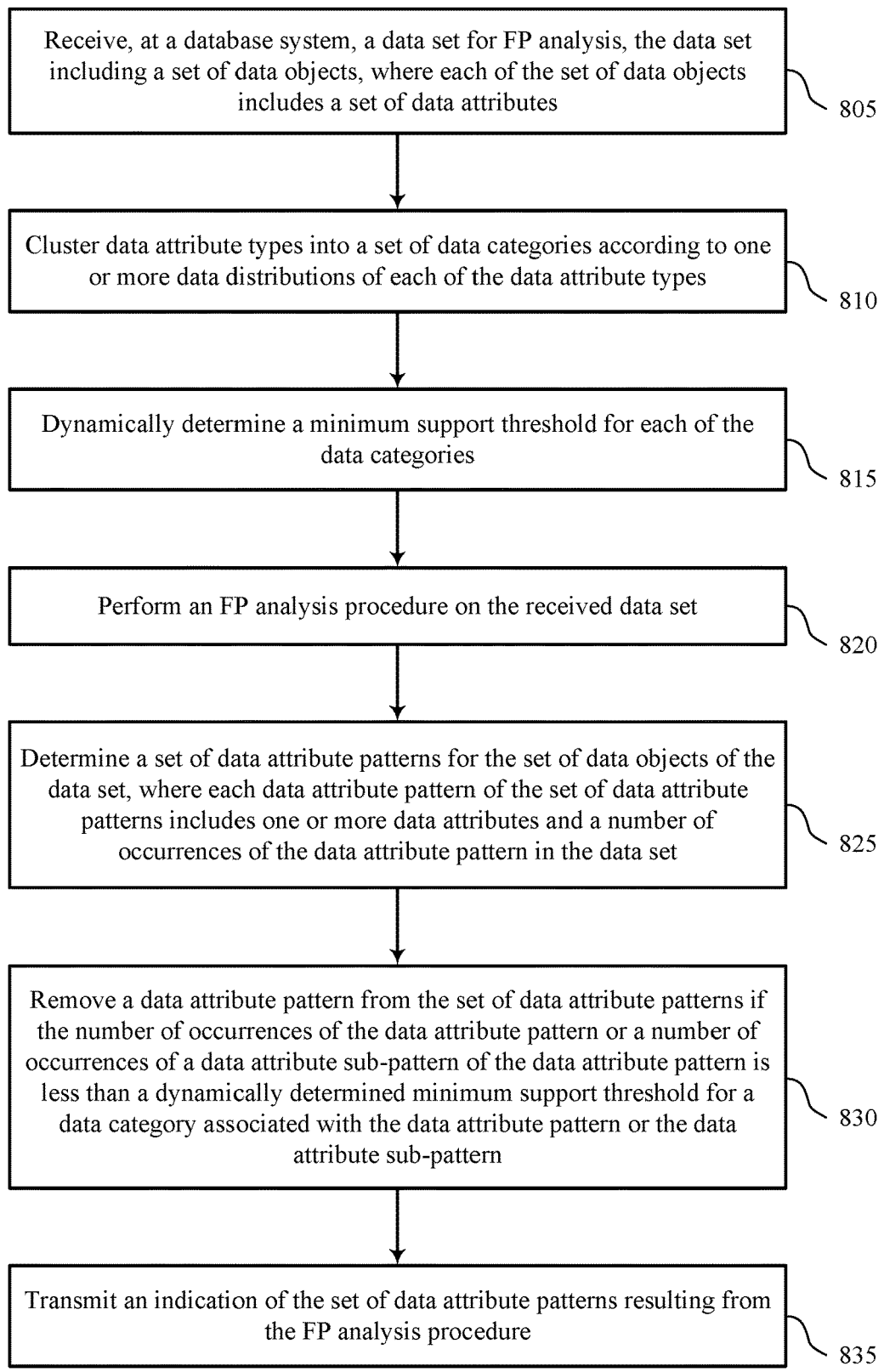
FIG. 8 shows a flowchart illustrating methods that support differential support for FP analysis in accordance with aspects of the present disclosure.

FIG. 8 shows a flowchart illustrating a method 800 that supports differential support for FP analysis in accordance with aspects of the present disclosure. The operations of method 800 may be implemented by a database system or its components as described herein. For example, the operations of method 800 may be performed by a dynamic support threshold module as described with reference to FIGS. 5 through 7. In some examples, a database system may execute a set of instructions to control the functional elements of the database system to perform the functions described below. Additionally or alternatively, a database system may perform aspects of the functions described below using special-purpose hardware.

At 805, the database system may receive a data set for FP analysis, the data set including a set of data objects, where each of the set of data objects includes a set of data attributes. The operations of 805 may be performed according to the methods described herein. In some examples, aspects of the operations of 805 may be performed by a data set reception component as described with reference to FIGS. 5 through 7.

At 810, the database system may cluster data attribute types into a set of data categories according to one or more data distributions of each of the data attribute types. The operations of 810 may be performed according to the methods described herein. In some examples, aspects of the operations of 810 may be performed by a clustering component as described with reference to FIGS. 5 through 7.

At 815, the database system may dynamically determine a minimum support threshold for each of the set of data categories. The operations of 815 may be performed according to the methods described herein. In some examples, aspects of the operations of 815 may be performed by a threshold determination component as described with reference to FIGS. 5 through 7.

At 820, the database system may perform an FP analysis procedure on the received data set. In some cases, the FP analysis procedure may include the functionality described below at 825 and 830. The operations of 820 may be performed according to the methods described herein. In some examples, aspects of the operations of 820 may be performed by an FP analysis component as described with reference to FIGS. 5 through 7.

At 825, the database system may determine a set of data attribute patterns for the set of data objects of the data set, where each data attribute pattern of the set of data attribute patterns includes one or more data attributes and a number of occurrences of the data attribute pattern in the data set. The operations of 825 may be performed according to the methods described herein. In some examples, aspects of the operations of 825 may be performed by a pattern identifier as described with reference to FIGS. 5 through 7.

At 830, the database system may remove a data attribute pattern from the set of data attribute patterns if the number of occurrences of the data attribute pattern or a number of occurrences of a data attribute sub-pattern of the data attribute pattern is less than a dynamically determined minimum support threshold for a data category associated with the data attribute pattern or the data attribute sub-pattern. The operations of 830 may be performed according to the methods described herein. In some examples, aspects of the operations of 830 may be performed by a threshold comparison component as described with reference to FIGS. 5 through 7.

At 835, the database system may transmit an indication of the set of data attribute patterns resulting from the FP analysis procedure. The operations of 835 may be performed according to the methods described herein. In some examples, aspects of the operations of 835 may be performed by a pattern transmission component as described with reference to FIGS. 5 through 7.

A method of FP analysis at a database system is described. The method may include receiving, at the database system, a data set for FP analysis, the data set including a set of data objects, where each of the set of data objects includes a set of data attributes, clustering data attribute types into a set of data categories according to one or more data distributions of each of the data attribute types, and dynamically determining a minimum support threshold for each of the set of data categories. The method may further include performing an FP analysis procedure on the received data set, where the FP analysis procedure includes: determining a set of data attribute patterns for the set of data objects of the data set, where each data attribute pattern of the set of data attribute patterns includes one or more data attributes and a number of occurrences of the data attribute pattern in the data set; and removing a data attribute pattern from the set of data attribute patterns if the number of occurrences of the data attribute pattern or a number of occurrences of a data attribute sub-pattern of the data attribute pattern is less than a dynamically determined minimum support threshold for a data category associated with the data attribute pattern or the data attribute sub-pattern. Additionally, the method may include transmitting an indication of the set of data attribute patterns resulting from the FP analysis procedure.

An apparatus for FP analysis at a database system is described. The apparatus may include a processor, memory in electronic communication with the processor, and instructions stored in the memory. The instructions may be executable by the processor to cause the apparatus to receive, at the database system, a data set for FP analysis, the data set including a set of data objects, where each of the set of data objects includes a set of data attributes, cluster data attribute types into a set of data categories according to one or more data distributions of each of the data attribute types, and dynamically determine a minimum support threshold for each of the set of data categories. The instructions may be further executable by the processor to cause the apparatus to perform an FP analysis procedure on the received data set, where the FP analysis procedure includes: determining a set of data attribute patterns for the set of data objects of the data set, where each data attribute pattern of the set of data attribute patterns includes one or more data attributes and a number of occurrences of the data attribute pattern in the data set; and removing a data attribute pattern from the set of data attribute patterns if the number of occurrences of the data attribute pattern or a number of occurrences of a data attribute sub-pattern of the data attribute pattern is less than a dynamically determined minimum support threshold for a data category associated with the data attribute pattern or the data attribute sub-pattern. Additionally, the instructions may be executable by the processor to cause the apparatus to transmit an indication of the set of data attribute patterns resulting from the FP analysis procedure.

Another apparatus for FP analysis at a database system is described. The apparatus may include means for receiving, at the database system, a data set for FP analysis, the data set including a set of data objects, where each of the set of data objects includes a set of data attributes, clustering data attribute types into a set of data categories according to one or more data distributions of each of the data attribute types, and dynamically determining a minimum support threshold for each of the set of data categories. The apparatus may further include means for performing an FP analysis procedure on the received data set, where the FP analysis procedure includes: determining a set of data attribute patterns for the set of data objects of the data set, where each data attribute pattern of the set of data attribute patterns includes one or more data attributes and a number of occurrences of the data attribute pattern in the data set; and removing a data attribute pattern from the set of data attribute patterns if the number of occurrences of the data attribute pattern or a number of occurrences of a data attribute sub-pattern of the data attribute pattern is less than a dynamically determined minimum support threshold for a data category associated with the data attribute pattern or the data attribute sub-pattern. Additionally, the apparatus may include means for transmitting an indication of the set of data attribute patterns resulting from the FP analysis procedure.

A non-transitory computer-readable medium storing code for FP analysis at a database system is described. The code may include instructions executable by a processor to receive, at the database system, a data set for FP analysis, the data set including a set of data objects, where each of the set of data objects includes a set of data attributes, cluster data attribute types into a set of data categories according to one or more data distributions of each of the data attribute types, and dynamically determine a minimum support threshold for each of the set of data categories. The instructions may be further executable by the processor to perform an FP analysis procedure on the received data set, where the FP analysis procedure includes: determining a set of data attribute patterns for the set of data objects of the data set, where each data attribute pattern of the set of data attribute patterns includes one or more data attributes and a number of occurrences of the data attribute pattern in the data set; and removing a data attribute pattern from the set of data attribute patterns if the number of occurrences of the data attribute pattern or a number of occurrences of a data attribute sub-pattern of the data attribute pattern is less than a dynamically determined minimum support threshold for a data category associated with the data attribute pattern or the data attribute sub-pattern. Additionally, the instructions may be executable by the processor to transmit an indication of the set of data attribute patterns resulting from the FP analysis procedure.

Some examples of the method, apparatuses, and non-transitory computer-readable medium described herein may further include operations, features, means, or instructions for identifying all possible sub-patterns associated with a data attribute pattern of the set of data attribute patterns and evaluating a support threshold for each of the possible sub-patterns, where the support threshold may be a smallest dynamically determined minimum support threshold corresponding to any data category to which a data attribute of the each of the possible sub-patterns belongs.

In some examples of the method, apparatuses, and non-transitory computer-readable medium described herein, one or more dynamically determined minimum support thresholds for the set of data categories may be based on a user input, a data distribution of a data attribute type, or a combination thereof.

In some examples of the method, apparatuses, and non-transitory computer-readable medium described herein, one or more dynamically determined minimum support thresholds for the set of data categories may be based on an average frequency of data attributes for a data category, a standard deviation within the data category, a minimum frequency value for an attribute in the data category, a maximum frequency value for an attribute in the data category, a number of data objects in the data set, one or more user input values, an importance metric of one or more data attributes grouped within the data category, or a combination thereof.

In some examples of the method, apparatuses, and non-transitory computer-readable medium described herein, the one or more data distributions of each of the data attribute types includes a set of distributions characterizing frequency of data attributes per data object and frequency of data objects per data attribute.

In some examples of the method, apparatuses, and non-transitory computer-readable medium described herein, the set of data objects may include a set of users within the database system and the set of data attributes may include activities performed by the set of users or characteristics associated with the set of users.

In some examples of the method, apparatuses, and non-transitory computer-readable medium described herein, the FP analysis may be performed by one or more data processing machines within the database system, the one or more data processing machines including database servers, application servers, server clusters, virtual machines, containers, or a combination thereof.

In some examples of the method, apparatuses, and non-transitory computer-readable medium described herein, dynamically determining the minimum support threshold for each of the set of data categories may include operations, features, means, or instructions for tuning the minimum support thresholds to manage a variance in the data distributions for each of the plurality of data categories. Some examples of the method, apparatuses, and non-transitory computer-readable medium described herein may further include operations, features, means, or instructions for performing one or more threshold determination algorithms to reduce noise from data with a high data distribution.

In some examples of the method, apparatuses, and non-transitory computer-readable medium described herein, tuning the minimum support thresholds to manage the variance in the data distributions for each of the set of data categories may include operations, features, means, or instructions for executing a hyper parameter tuning process.

In some examples of the method, apparatuses, and non-transitory computer-readable medium described herein, performing the FP analysis procedure on the received data set may include operations, features, means, or instructions for executing a condensed data structure for an FP mining process, wherein the condensed data structure comprises an FP-tree and a linked list.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for frequent pattern (FP) analysis at a database system, comprising:
   receiving, at the database system, a data set for FP analysis, the data set comprising a plurality of data objects, wherein each of the plurality of data objects comprises a set of data attributes;
   clustering data attribute types into a plurality of data categories according to one or more data distributions of each of the data attribute types, wherein the clustering comprises clustering the data attribute types satisfying a global minimum support threshold for the data set and refraining from clustering one or more data attribute types that occur less frequently in the data set than the global minimum support threshold;
   dynamically determining a plurality of minimum support thresholds for the plurality of data categories, wherein a first minimum support threshold of the plurality of minimum support thresholds is different from a second minimum support threshold of the plurality of minimum support thresholds;
   performing an FP analysis procedure on the received data set, wherein the FP analysis procedure comprises:
      determining a set of data attribute patterns for the plurality of data objects of the data set, wherein each data attribute pattern of the set of data attribute patterns comprises one or more data attributes and a number of occurrences of the data attribute pattern in the data set;
      removing a data attribute pattern from the set of data attribute patterns when the number of occurrences of the data attribute pattern is less than a dynamically determined minimum support threshold of the plurality of minimum support thresholds; and
      removing the data attribute pattern from the set of data attribute patterns when a number of occurrences of a data attribute sub-pattern of the data attribute pattern is less than the dynamically determined minimum support threshold, wherein the dynamically determined minimum support threshold corresponds to a data category associated with the data attribute pattern or the data attribute sub-pattern;
   receiving, at a user interface associated with the database system, a user input indicating a selection of a data attribute; and
   transmitting, in response to the user input, an indication of one or more data attribute patterns of the set of data attribute patterns that comprise the selected data attribute based at least in part on querying a local data structure resulting from the FP analysis procedure.

2. The method of claim 1, further comprising:
   identifying all possible sub-patterns associated with a second data attribute pattern of the set of data attribute patterns; and
   evaluating a support threshold for each of the possible sub-patterns, wherein the support threshold is a smallest dynamically determined minimum support threshold of a set of dynamically determined minimum support thresholds corresponding to data categories to which data attributes in the possible sub-patterns belong.

3. The method of claim 1, wherein one or more dynamically determined minimum support thresholds for the plurality of data categories is based at least in part on the user input, a data distribution of a data attribute type, or a combination thereof.

4. The method of claim 1, wherein one or more dynamically determined minimum support thresholds for the plurality of data categories is based at least in part on an average frequency of data attributes for a data category, a standard deviation within the data category, a minimum frequency value for an attribute in the data category, a maximum frequency value for an attribute in the data category, a number of data objects in the data set, one or more user input values, an importance metric of one or more data attributes grouped within the data category, or a combination thereof.

5. The method of claim 1, wherein the one or more data distributions of each of the data attribute types comprises a set of distributions characterizing frequency of data attributes per data object and frequency of data objects per data attribute.

6. The method of claim 1, wherein the plurality of data objects comprises a plurality of users within associated with a tenant of the database system, and wherein the set of data attributes comprises activities performed by the plurality of users and characteristics associated with the tenant.

7. The method of claim 1, wherein the FP analysis is performed by one or more data processing machines within the database system, the one or more data processing machines comprising database servers, application servers, server clusters, virtual machines, containers, or a combination thereof.

8. The method of claim 1, wherein dynamically determining the plurality of minimum support thresholds for the plurality of data categories further comprises:
tuning the plurality of minimum support thresholds to manage a variance in the one or more data distributions for the plurality of data categories; and
performing one or more threshold determination algorithms to reduce noise from data with a high data distribution.

9. The method of claim 8, wherein tuning the plurality of minimum support thresholds to manage the variance in the one or more data distributions for the plurality of data categories comprises:
executing a hyper parameter tuning process.

10. The method of claim 1, wherein performing the FP analysis procedure on the received data set further comprises:
executing a condensed data structure for an FP mining process, wherein the condensed data structure comprises an FP-tree and a linked list.

11. An apparatus for frequent pattern (FP) analysis at a database system, comprising:
a processor;
memory in electronic communication with the processor; and
instructions stored in the memory and executable by the processor to cause the apparatus to:
receive, at the database system, a data set for FP analysis, the data set comprising a plurality of data objects, wherein each of the plurality of data objects comprises a set of data attributes;
cluster data attribute types into a plurality of data categories according to one or more data distributions of each of the data attribute types, wherein the instructions to cluster the data attribute types are further executable by the processor to cause the apparatus to cluster the data attribute types satisfying a global minimum support threshold for the data set and refrain from clustering one or more data attribute types that occur less frequently in the data set than the global minimum support threshold;
dynamically determine a plurality of minimum support thresholds for the plurality of data categories, wherein a first minimum support threshold of the plurality of minimum support thresholds is different from a second minimum support threshold of the plurality of minimum support thresholds;
perform an FP analysis procedure on the received data set, wherein the instructions to perform the FP analysis procedure are executable by the processor to cause the apparatus to:
determine a set of data attribute patterns for the plurality of data objects of the data set, wherein each data attribute pattern of the set of data attribute patterns comprises one or more data attributes and a number of occurrences of the data attribute pattern in the data set;
remove a data attribute pattern from the set of data attribute patterns when the number of occurrences of the data attribute pattern is less than a dynamically determined minimum support threshold of the plurality of minimum support thresholds; and
remove the data attribute pattern from the set of data attribute patterns when a number of occurrences of a data attribute sub-pattern of the data attribute pattern is less than the dynamically determined minimum support threshold, wherein the dynamically determined minimum support threshold corresponds to a data category associated with the data attribute pattern or the data attribute sub-pattern;
receive, at a user interface associated with the database system, a user input indicating a selection of a data attribute; and
transmit, in response to the user input, an indication of one or more data attribute patterns of the set of data attribute patterns that comprise the selected data attribute based at least in part on querying a local data structure resulting from the FP analysis procedure.

12. The apparatus of claim 11, wherein the instructions are further executable by the processor to cause the apparatus to:
identify all possible sub-patterns associated with a second data attribute pattern of the set of data attribute patterns; and
evaluate a support threshold for each of the possible sub-patterns, wherein the support threshold is a smallest dynamically determined minimum support threshold of a set of dynamically determined minimum support thresholds corresponding to data categories to which data attributes in the possible sub-patterns belong.

13. The apparatus of claim 11, wherein one or more dynamically determined minimum support thresholds for the plurality of data categories is based at least in part on the user input, a data distribution of a data attribute type, or a combination thereof.

14. The apparatus of claim 11, wherein one or more dynamically determined minimum support thresholds for the plurality of data categories is based at least in part on an average frequency of data attributes for a data category, a standard deviation within the data category, a minimum frequency value for an attribute in the data category, a maximum frequency value for an attribute in the data category, a number of data objects in the data set, one or more user input values, an importance metric of one or more data attributes grouped within the data category, or a combination thereof.

15. The apparatus of claim 11, wherein the one or more data distributions of each of the data attribute types comprises a set of distributions characterizing frequency of data attributes per data object and frequency of data objects per data attribute.

16. The apparatus of claim 11, wherein the FP analysis is performed by one or more data processing machines with the database system, the one or more data processing machines comprising database servers, application servers, server clusters, virtual machines, containers, or a combination thereof.

17. The apparatus of claim 11, wherein the instructions to dynamically determine the plurality of minimum support thresholds for the plurality of data categories are further executable by the processor to cause the apparatus to:

tune the plurality of minimum support thresholds to manage a variance in the one or more data distributions for the plurality of data categories; and perform one or more threshold determination algorithms to reduce noise from data with a high data distribution.

18. The apparatus of claim 17, wherein the instructions to tune the plurality of minimum support thresholds to manage the variance in the one or more data distributions for the plurality of data categories are executable by the processor to cause the apparatus to:

execute a hyper parameter tuning process.

19. The apparatus of claim 11, wherein the instructions to perform the FP analysis procedure on the received data set are further executable by the processor to cause the apparatus to:

execute a condensed data structure for an FP mining process, wherein the condensed data structure comprises an FP-tree and a linked list.

20. A non-transitory computer-readable medium storing code for frequent pattern (FP) analysis at a database system, the code comprising instructions executable by a processor to:

receive, at the database system, a data set for FP analysis, the data set comprising a plurality of data objects, wherein each of the plurality of data objects comprises a set of data attributes;

cluster data attribute types into a plurality of data categories according to one or more data distributions of each of the data attribute types, wherein the instructions to cluster the data attribute types are executable by the processor to cluster the data attribute types satisfying a global minimum support threshold for the data set and refrain from clustering one or more data attribute types that occur less frequently in the data set than the global minimum support threshold;

dynamically determine a plurality of minimum support thresholds for the plurality of data categories, wherein a first minimum support threshold of the plurality of minimum support thresholds is different from a second minimum support threshold of the plurality of minimum support thresholds;

perform an FP analysis procedure on the received data set, wherein the instructions to perform the FP analysis procedure are executable by the processor to:

determine a set of data attribute patterns for the plurality of data objects of the data set, wherein each data attribute pattern of the set of data attribute patterns comprises one or more data attributes and a number of occurrences of the data attribute pattern in the data set;

remove a data attribute pattern from the set of data attribute patterns when the number of occurrences of the data attribute pattern is less than a dynamically determined minimum support threshold of the plurality of minimum support thresholds; and remove the data attribute pattern from the set of data attribute patterns when a number of occurrences of a data attribute sub-pattern of the data attribute pattern is less than the dynamically determined minimum support threshold, wherein the dynamically determined minimum support threshold corresponds to a data category associated with the data attribute pattern or the data attribute sub-pattern;

receive, at a user interface associated with the database system, a user input indicating a selection of a data attribute; and transmit, in response to the user input, an indication of one or more data attribute patterns of the set of data attribute patterns that comprise the selected data attribute based at least in part on querying a local data structure resulting from the FP analysis procedure.

* * * * *